United States Patent
Stephens

(10) Patent No.: US 9,210,648 B2
(45) Date of Patent: Dec. 8, 2015

(54) MULTIPLE MODE SUPPORT IN A WIRELESS LOCAL AREA NETWORK

(71) Applicant: Intel Corporation, Santa Clara, CA (US)

(72) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 13/654,367

(22) Filed: Oct. 17, 2012

(65) Prior Publication Data

US 2013/0039351 A1 Feb. 14, 2013

Related U.S. Application Data

(63) Continuation of application No. 10/446,565, filed on May 27, 2003, now abandoned.

(51) Int. Cl.
*H04W 48/02* (2009.01)
*H04W 28/10* (2009.01)

(52) U.S. Cl.
CPC .............. *H04W 48/02* (2013.01); *H04W 28/10* (2013.01)

(58) Field of Classification Search
CPC ..... H04W 48/02; H04W 48/04; H04W 48/08; H04W 48/18; H04W 28/10
USPC ........ 370/322, 329, 338, 341, 348; 455/552.1
See application file for complete search history.

(56) References Cited

U.S. PATENT DOCUMENTS

| | | | |
|---|---|---|---|
| 5,361,258 A | 11/1994 | Arnold et al. | |
| 6,272,120 B1 * | 8/2001 | Alexander | 370/338 |
| 6,275,697 B1 | 8/2001 | King et al. | |
| 6,714,530 B1 * | 3/2004 | Haartsen et al. | 370/347 |
| 6,895,255 B1 * | 5/2005 | Bridgelall | 455/552.1 |
| 7,110,380 B2 | 9/2006 | Shvodian | |
| 7,277,412 B2 | 10/2007 | Sugaya et al. | |
| 7,280,801 B2 | 10/2007 | Dahl | |
| 7,643,463 B1 * | 1/2010 | Linsky et al. | 370/344 |

(Continued)

FOREIGN PATENT DOCUMENTS

| | | |
|---|---|---|
| EP | 1199842 A2 | 4/2002 |
| WO | 01/24454 A1 | 4/2001 |

(Continued)

OTHER PUBLICATIONS

Chinese Office Action Received for Chinese Patent Application No. 200480014505.8, mailed on Dec. 28, 2007, 27 pages of Office Action including 18 pages of English Translation.

(Continued)

*Primary Examiner* — Paul H Masur
*Assistant Examiner* — Kabir Jahangir
(74) *Attorney, Agent, or Firm* — Schubert Law Group PLLC

(57) ABSTRACT

Briefly, in accordance with one embodiment of the invention, an access point may provide multiple access to a single medium by providing time division multiple access to the medium. During a first phase to communicate with devices of a first type, the access point may transmit a beacon to indicate to devices of a second type not to communicate during the first phase. During a second phase to communicate with devices of the second type, the access point may transmit a beacon to indicate to devices of the first type not to communicate during the second phase. In one particular embodiment, the access point may transmit a medium reservation packet to indicate reservation of the medium for affected devices. Phases may be adaptively extended by transmitting additional medium reservation packets until it is desired to end the present phase and transition to the second phase.

16 Claims, 4 Drawing Sheets

(56) References Cited

U.S. PATENT DOCUMENTS

| | | | |
|---|---|---|---|
| 2002/0059434 A1* | 5/2002 | Karaoguz et al. | 709/228 |
| 2002/0093929 A1* | 7/2002 | Mangold et al. | 370/336 |
| 2002/0105970 A1 | 8/2002 | Shvodian | |
| 2002/0136184 A1 | 9/2002 | Liang et al. | |
| 2003/0139198 A1* | 7/2003 | Johannisson et al. | 455/525 |
| 2004/0013135 A1* | 1/2004 | Haddad | 370/493 |
| 2004/0121770 A1* | 6/2004 | Tigerstedt et al. | 455/436 |
| 2004/0240402 A1 | 12/2004 | Stephens | |

FOREIGN PATENT DOCUMENTS

| | | | |
|---|---|---|---|
| WO | 02/13429 A1 | 2/2002 | |
| WO | 03/007550 A2 | 1/2003 | |
| WO | 2004/107668 A2 | 12/2004 | |
| WO | 2004/107668 A3 | 3/2005 | |

OTHER PUBLICATIONS

Chinese Office Action Received for Chinese Patent Application No. 200480014505.8, mailed on Aug. 1, 2008, 22 pages of Office Action including 14 pages of English Translation.

Chinese Office Action Received for Chinese Patent Application No. 200480014505.8, mailed on Jul. 24, 2009, 25 pages of Office Action including 16 pages of English Translation.

International Search Report/Written Opinion for PCT Patent Application No. PCT/US2004/014849, mailed on Nov. 24, 2004, 12 pages.

International Preliminary Report on Patentability for PCT Patent Application No. PCT/US2004/014849, mailed on Dec. 15, 2005, 7 pages.

U.S. Appl. No. 60/430,448, Peter A. Dahl, Dec. 2, 2002, 4 pages.

European Patent Office action received for Application No. 04751993.9-1525, dated Mar. 30, 2006, 4 pages.

Malaysian Office Action Received for Malaysian Application No. PI20042046, mailed on Nov. 19, 2007, 3 pages.

Malaysian Office Action Received for Malaysian Application No. PI20042046, mailed on Jun. 29, 2012, 6 pages.

Malaysian Office Action Received for Malaysian Application No. PI20042046, mailed on Jun. 30, 2015, 2 pages.

European Patent Office action received for Application No. 04751993.9-1525, dated Sep. 28, 2006, 3 pages.

* cited by examiner

MULTIPLE MODE SUPPORT IN A WIRELESS LOCAL AREA NETWORK

BACKGROUND

In advancing wireless technology, many devices will exist that operate using one or more of various wireless standards. Such wireless devices may be operating within the same environment and thereby access the same medium, for example so that legacy devices may still operate with access points that are developed to communicate in accordance with newly developed standards.

DETAILED DESCRIPTION OF EMBODIMENTS

Figure 1:
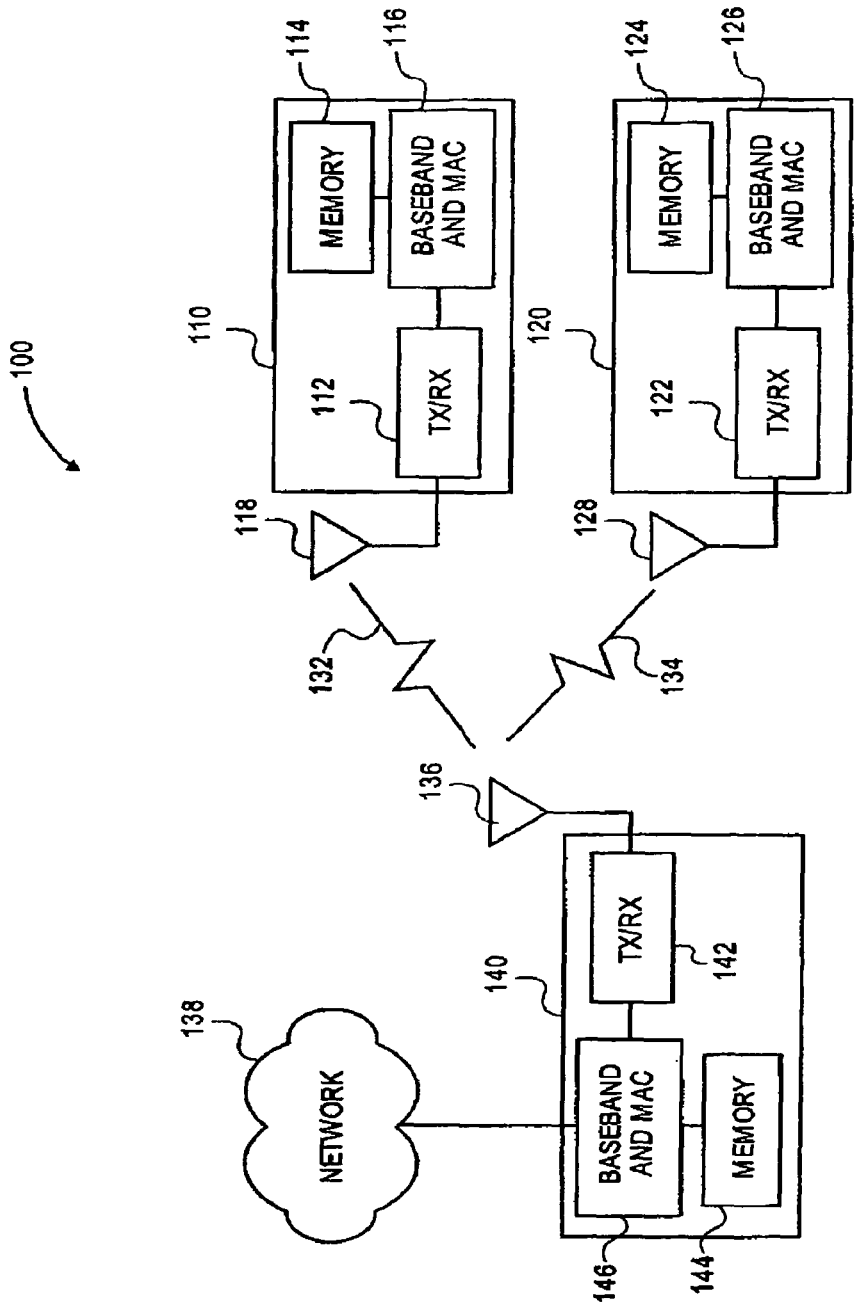
FIG. 1 depicts an embodiment of a block diagram of a wireless local area network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network in accordance with one embodiment of the present invention will be discussed. In the wireless local area network (WLAN) system 100 shown in FIG. 1, a first device 110 may include a wireless transceiver 112 to couple to an antenna 118 and to a baseband processor 116. Baseband processor 116 in one embodiment may comprise a single processor, or alternatively may comprise a baseband processor and an applications processor, although the scope of the invention is not limited in this respect. Baseband processor 116 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as baseband processor 116, or alternatively some portion or all of memory 114 may be disposed on an integrated circuit or other medium, for example a hard disk drive, that is external to the integrated circuit of baseband processor 116, although the scope of the invention is not limited in this respect. Likewise, a second device 120 may include a transceiver 122, baseband processor 126, memory 124, and antenna 128, and access point 140 may include a transceiver 142, memory 144, and baseband processor 146.

First device 110 and second device 120 may communicate with access point 140 via wireless communication links 132 and 134, where access point 140 may include at least one antenna 136. Alternatively, access point 140, and 'optionally' first device 110 and second device 120, may include two or more antennas to provide a diversity antenna arrangement, to provide spatial division multiple access (SDMA), or to provide a multiple input, multiple output (MIMO) system, or the like, although the scope of the invention is not limited in this respect. Access point 140 may couple with network 138 so that first device 110 and second device 120 may communicate with network 138, including devices coupled to network 138, by communicating with access point 140 via wireless communication links 132 and 134. Network 138 may include a public network such as a telephone network or the Internet, or alternatively network 138 may include a private network such as an intranet, or a combination of a public and a private network, although the scope of the invention is not limited in this respect. Communication between user first device 110 and second device 120 and access point 140 may be implemented via a wireless local area network (WLAN), for example a network compliant with a an Institute of Electrical and Electronics Engineers (IEEE) standard such as IEEE 802.11a, IEEE 802.11b, IEEE 802.15, IEEE 802.16, and so on, and may for example operate in a basic services set (BSS) arrangement, although the scope of the invention is not limited in this respect. In another embodiment, communication between user system 128 and access point 128 may be implemented via a cellular communication network compliant with a Third Generation Partnership Project (3GPP) standard, although the scope of the invention is not limited in this respect.

In accordance with one embodiment of the invention, access point 140 may be a multimode access point (MAP) in that access point may allow first device 110 and second device 120 to communicate with access point 140 even though first device 110 and second device 120 may not be capable of communicating with one another, for example where first device 110 is arranged to communicate using a first wireless standard such as the IEEE 802.11a standard, and where second device 120 is arranged to communicate using a second wireless standard such as a higher throughput wireless communication standard directed toward, for example, operation at or near the 5 GHz frequency of the IEEE 802.11a standard, although the scope of the invention is not limited in this respect. In one embodiment, first device 110, second device 120, and access point 140 may be arranged to communicate over an identical or similar frequency band, for example near 5 GHz, wherein the transceivers 112, 122, and 140 of first device 110, second device 120, and access point 140 are arranged to operate on a compatible physical layer, although the scope of the invention is not limited in this respect. In such embodiments, first device 110 and second device 120 may not be able to receive and honor a wireless medium reservation made by the other device, or may not receive or process medium reservation packets sent by the other device, although the scope of the invention is not limited in this respect. In accordance with one embodiment of the invention, access point 140 may allow both first device 110 and second device 120 to operate with access point 140 without requiring a modification to the protocol under which the devices operate, although the scope of the invention is not limited in this respect.

Figure 2:
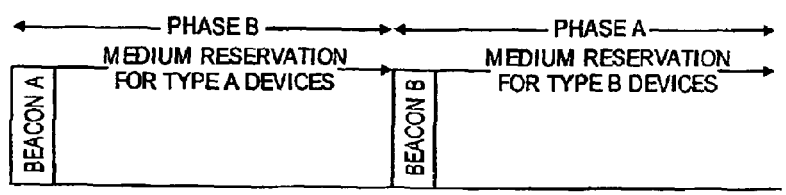
FIG. 2 depicts an embodiment of a diagram of a beacon medium reservation operation.
Figure 3:
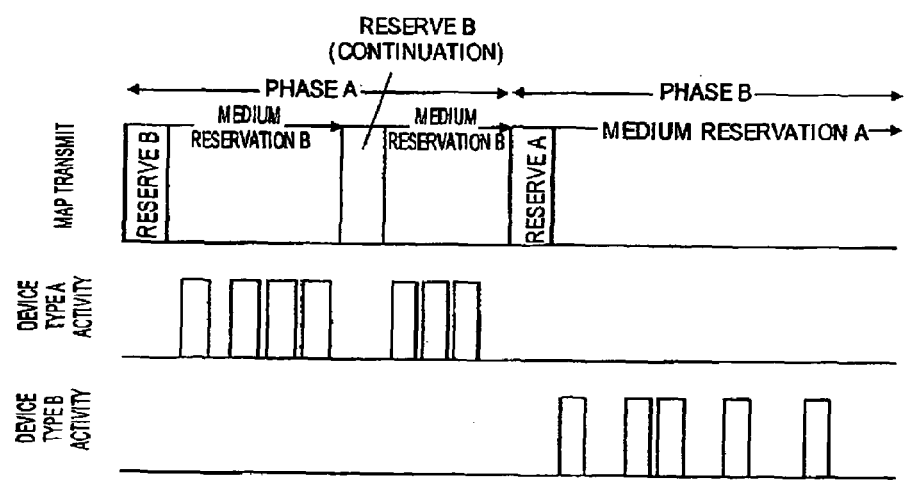
FIG. 3 illustrates an embodiment of a diagram of a distributed medium access operation.

As shown in FIG. 1, access point 140 may provide support for the mixture of two or more devices, such as first device 110 and second device 120, and may coordinate the operation of wireless local area network 100. In one embodiment of the invention, access point 140 may operate to divide time into two phases, phase A and phase B as shown in FIGS. 2 and 3. Devices of a first type, for example first device 110, may operate during phase A, and devices of a second type, for example second device 120, may operate during phase B. Devices intended to operate during phase A may be referred to as type A devices, and devices intended to operate during phase B may be referred to as type B devices, although the scope of the invention is not limited in this respect. During phase A, type A devices and access point 140 may be considered as a first subnetwork, subnetwork A, and during phase B, type B devices and access point 140 may be considered as a second subnetwork, subnetwork B, although the scope of the invention is not limited in this respect. In one particular embodiment of the invention, access point 140 may initiate frame exchange operations via a poll mechanism wherein access point 140 may poll devices of type A during phase A, and may poll devices of type B during phase B, although the scope of the invention is not limited in this respect.

Referring now to FIG. 2, a diagram of a beacon medium reservation operation in accordance with one embodiment of the present invention will be discussed. In wireless local area network 100, access point 140 may periodically transmit a beacon to provide privileged access to the medium for access point 140. Although the beacon medium reservation operation shown in FIG. 2 is discussed with respect to using privileged access by way of example, the invention is not limited in this respect. In one embodiment, the beacon medium reservation operation of FIG. 2 may be referred to as a privileged access operation to provide privileged access to the wireless medium for access point 140, although the scope of the invention is not limited in this respect. As shown in FIG. 2, access point 140 may transmit a beacon that is received by devices of subnetwork A, beacon A, at the start of phase B. Likewise, access point 140 may transmit a beacon that is received by devices of subnetwork B, beacon B, at the start of phase A. The transmitted beacons, beacon A and beacon B, may include a privileged medium reservation for access point 140 to prevent devices of the other phase from operating during the present phase. For example, first device 110 may be designated as able to operate during phase A and may be generally referred to as a type A device, and second device 120 may be designated as able to operate during phase B and may be referred to as a type B device, although the scope of the invention is not limited in this respect. The beacon for phase A, beacon A, may be received by type A devices and may contain a medium reservation to prevent type A devices, e.g., first device 110, from transmitting during phase B. Type B devices may access the medium and access point 140 during phase B because type B devices have not received and acted upon the medium reservation contained in beacon A. Similarly, the beacon for phase B, beacon B, may be received by type B devices and may contain a medium reservation to prevent type B devices, e.g., second device 120, from transmitting during phase A. Type A devices may access the medium and access point 140 during phase A because type A devices have not received and acted upon the medium reservation contained in beacon B, although the scope of the invention is not limited in this respect. The beacon medium reservation operation as shown in FIG. 2 may allow wireless local area network 100 to operate using time division multiple access, although the scope of the invention is not limited in this respect.

Referring now to FIG. 3, a diagram of a distributed medium access operation in accordance with one embodiment of the present invention will be discussed. In one embodiment of the invention, wireless local area network 100 may be based on carrier sense multiple access/collision avoidance (CSMA/CA) with medium reservation packets, although the scope of the invention is not limited in this respect. In such an embodiment, access point 140 may gain access to the medium prior to phase A, and may transmit a medium reservation in a medium reservation packet, reserve B, where the medium reservation packet may be honored by type B devices, for example second device 120, but may not be received or honored by type A devices, for example first device 110. As a result of the medium reservation packet, reserve B, type A devices may continue to operate under a CSMA/CA protocol during phase A, and type B devices do not attempt to transmit during phase A. Access point 140 may extend the duration of phase A by transmitting additional medium reservation packets, reserve B continuation, that are honored only by type B devices, thereby allowing type A devices to continue to operate during phase A, although the scope of the invention is not limited in this respect.

At the end of phase A, access point 140 may gain access to the wireless medium and may transmit a medium reservation in a medium reservation packet, reserve A, at the start of phase B, where the medium reservation packet may be honored by type A devices, but may not be received or honored by type B devices. As a result, type B devices may continue to operate under a CSMA/CA protocol during phase B, and type A devices do not attempt to transmit during phase B. Access point 140 may extend the duration of phase B by transmitting additional medium reservation packets that are honored only by type A devices, thereby allowing type B devices to continue to operate during phase B, although the scope of the invention is not limited in this respect.

As shown in FIG. 3, access point 140 may transmit a medium reservation that is honored by type B devices, thereby permitting type A devices to operate during phase A. The use of a continuation reservation is also shown in phase A. After the completion of phase A, at the start of phase B, access point 140 may transmit a medium reservation that is honored by type A devices. Type B devices then are able to access the medium during phase B. In the example shown in FIG. 3, although there may be periods of inactivity for type B devices in phase B, devices of type A may be prevented from accessing the medium because of the medium reservation packets, reserve A, transmitted by access point 140, although the scope of the invention is not limited in this respect. Likewise, though there may be periods of inactivity of for type A devices in phase A, devices of type B may be prevented from accessing the medium because reservation packets, reserve B, transmitted by access point 140, although the scope of the invention is not limited in this respect. The distributed medium access operation as shown in FIG. 2 may allow wireless local area network 100 to operate using adaptive time division multiple access by adjusting the duration of the phases, phase A and phase B, according to the load it observes in the corresponding subnetworks, subnetwork A and subnetwork B, although the scope of the invention is not limited in this respect.

In one alternative embodiment, the multiple access operation of wireless local area network 100 using a poll mechanism may generally be extended to any number of device types, N device types by dividing time into N phases, phase A, phase B, up to phase N and operating the appropriate protocol during its respective phase, although the scope of the invention is not limited in this respect. In another alternative embodiment, the multiple access operation of wireless local area network 100 using privileged access using a beacon medium operation as shown in FIG. 2 likewise may be extended to N device types by overlapping medium reservations signaled in beacons so that each device type may see precisely one contiguous period during which access point 140 has not reserved the medium to itself, although the scope of the invention is not limited in this respect. In alternative embodiments, the beacon need not be transmitted using any privilege. In a further alternative embodiment, the multiple access operation of wireless local area network 100 using a distributed medium access operation as shown in FIG. 3 likewise may be extended to N device types by permitting operation of a single device type during its corresponding phase through the transmission of medium reservation packets for all other device types at the start of the corresponding phase. For example, in a three phase case, the access point 140 may transmit medium reservation packets for device types B and C at the start of phase A, although the scope of the invention is not limited in this respect.

Figure 4:
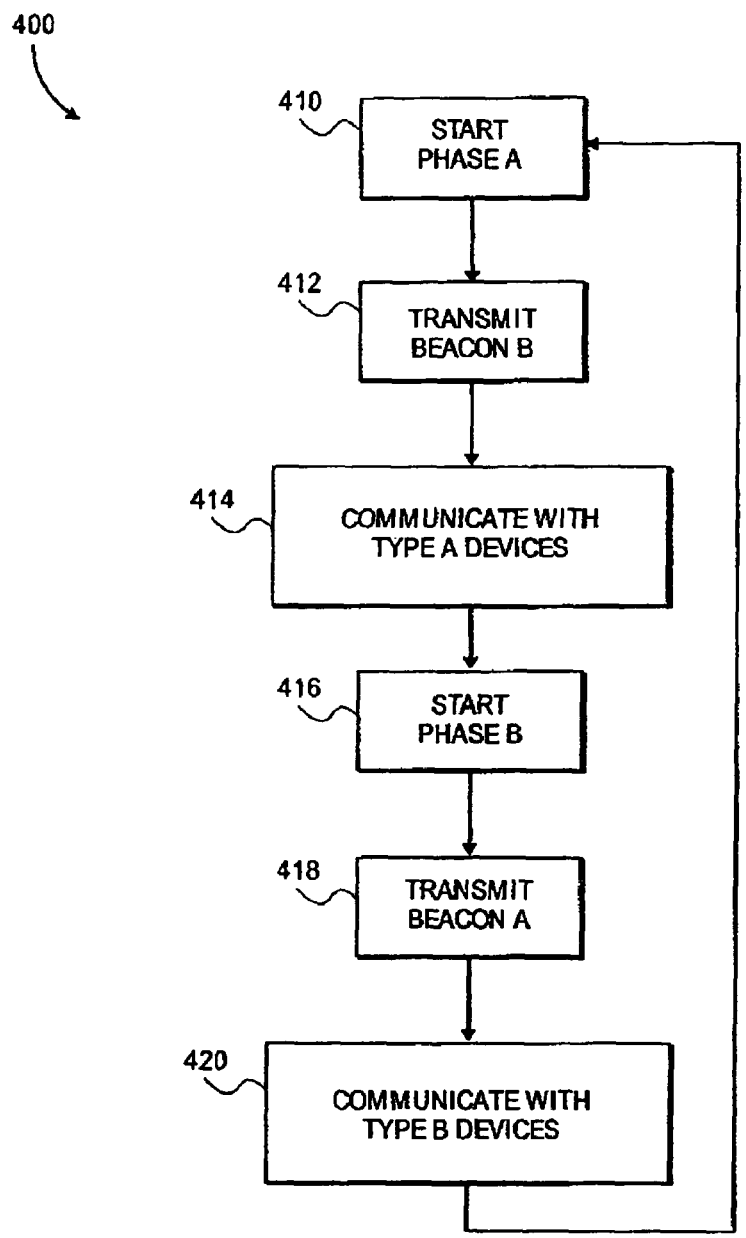
FIG. 4 illustrates a flow chart of an embodiment for a method to provide multiple mode support in a wireless local area network.

Referring now to FIG. 4, a flow diagram of a method to provide multiple mode support using a beacon medium reservation operation in a wireless local area network in accordance with an embodiment of the present invention will be discussed. Method 400 may be implemented by access point 140 and may be tangibly embodied as instructions stored on memory 144 of access point 140, although the scope of the invention is not limited in this respect. Method 400 may initiate by starting phase A at block 410. At the start of phase A, access point 140 may transmit beacon B at block 412 where beacon B may include a privileged medium reservation to indicate to type B devices to not transmit during phase A. As a result, access point 140 may communicate with type A devices at block 414 without interference from type B devices. After a predetermined period, phase B may start at block 416 at which time access point 140 may transmit beacon A where beacon A may include a privileged medium reservation to indicate to type A devices to not transmit during phase B. As a result, access point 140 may communicate with type B devices at block 420 without interference from type A devices. After a predetermined period, method 400 may continue with phase A at block 410, although the scope of the invention is not limited in this respect.

Figure 5:
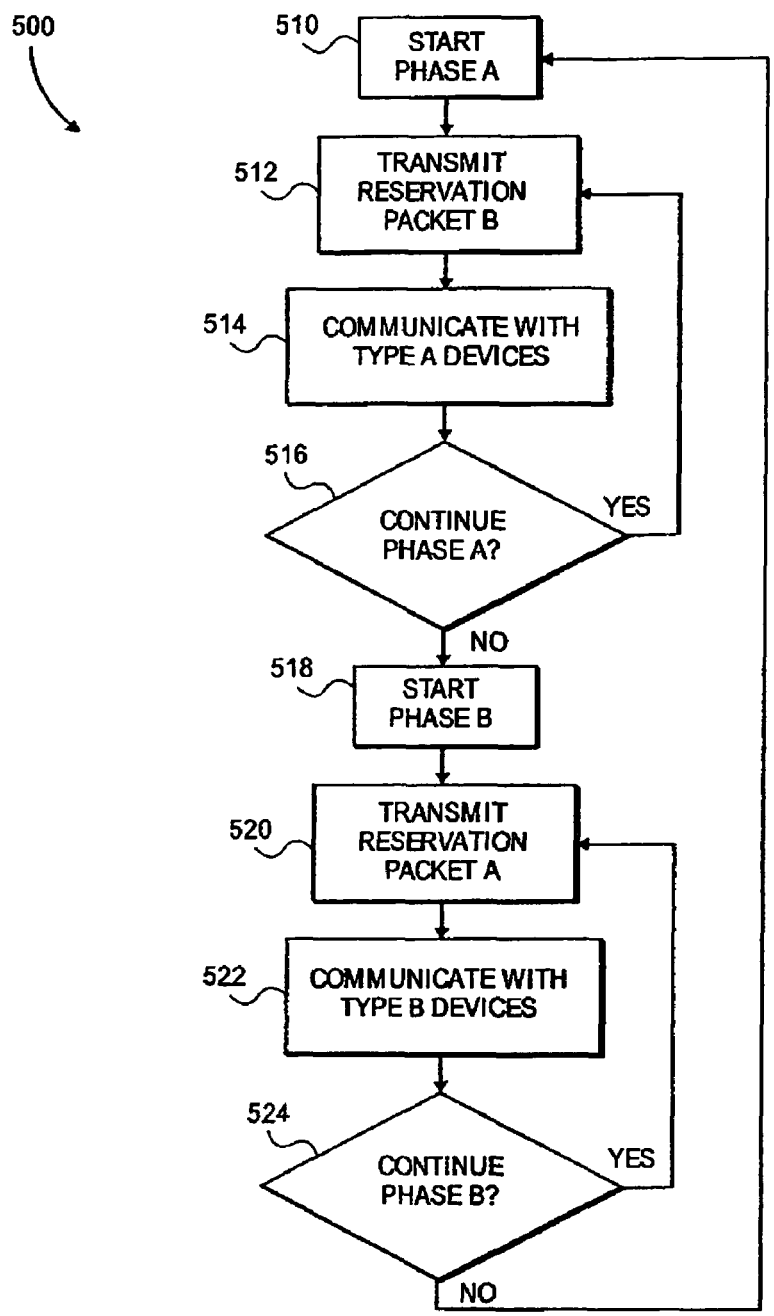
FIG. 5 illustrates a flow chart of an embodiment for a method to provide multiple mode support using a distributed medium access operation in a wireless local area network.

Referring now to FIG. 5, a flow diagram of a method to provide multiple mode support using a distributed medium access operation in a wireless local area network in accordance with an embodiment of the present invention will be discussed. Method 500 may be implemented by access point 140 and may be tangibly embodied as instructions stored on memory 144 of access point 140, although the scope of the invention is not limited in this respect. Method 500 may initiate by starting phase A at block 510. At the start of phase A, access point 140 may transmit reservation packet B at block 512 to indicate to type B devices not to transmit during phase A. As a result, access point 140 may communicate with type A devices at block 514 without interference from type B devices. At block 516, access point 140 may determine whether to continue phase A, and if so, the access point 140 may transmit an additional reservation packet B at block 512 to extend phase A and to continue with method 500 at block 512. In the event access point 140 determines at block 516 not to continue phase A, phase B may start at block 518. At the start of phase B, access point may transmit a reservation packet A to indicate to type A devices not to transmit during phase B. As a result, access point may communicate with type B devices at block 522 without interference from type A devices. At block 524, access point 140 may determine whether to continue phase B, and if so, the access point 140 may transmit an additional reservation packet A at block 524 to extend phase B and to continue with method 500 at block 524. In the event access point 140 determines at block 524 not to continue phase B, phase A may start again at block 510, and method 500 may continue at block 510, although the scope of the invention is not limited in this respect.

Although the invention has been described with a certain degree of particularity, it should be recognized that elements thereof may be altered by persons skilled in the art without departing from the spirit and scope of the invention. It is believed that the wireless local area network supporting multiple modes of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
during a first phase in which to communicate with devices of a first type, transmitting a first beacon frame to indicate to devices of a second type not to transmit during the first phase;
communicating with devices of the first type during the first phase;
extending to another device by overlapping medium reservations signaled with another beacon frame;
during a second phase in which to communicate with devices of a second type, transmitting a second beacon frame to indicate to devices of the first type not to transmit during the second phase; and
communicating with devices of the second type during the second phase;
wherein the first phase and the second phase are non-overlapping in time.

2. A method as claimed in claim 1, wherein extending to another device type comprises a third phase in which to communicate with devices of a third type, wherein a third beacon frame is transmitted during the first phase to indicate to devices of the third type not to transmit during the first phase, and wherein a fourth beacon frame is transmitted during the second phase.

3. A method as claimed in claim 2, wherein devices of the third type include devices to operate in compliance with a third communications standard.

4. A method as claimed in claim 1, wherein devices of the first type are unable to communicate with devices of the second type.

5. A method as claimed in claim 1, wherein devices of the first type operate at approximately the same frequency as devices of the second type.

6. A method as clamed in claim 1, wherein the beacon frame is periodically transmitted.

7. A method as claimed in claim 1, wherein the beacon frames indicate to devices of three or more types of devices not to transmit during phases that do not correspond to devices of the three or more types; and further comprising communicating with devices of the three or more types during phases that correspond to devices of a respective one of the three or more types.

8. A method as claimed in claim 1, wherein devices of the first type include devices to operate in compliance with a first communications standard, and wherein devices of the second type include devices to operate in compliance with a second communications standard.

9. An article comprising a non-transitory storage medium having stored thereon instructions that, when executed by a computing platform, result in providing multiple access to a medium in a wireless local area network by:
during a first phase in which to communicate with devices of a first type, transmitting a first beacon to indicate to devices of a second type not to transmit during the first phase;
communicating with devices of the first type during the first phase;
extending to another device typr by overlapping medium reservations signaled with another beacon frame;
during a second phase in which to communicate with devices of the second type, transmitting a second beacon to indicate to devices of the first type not to transmit during the second phase; and
communicating with devices of the second type during the second phase;
wherein the first phase and the second phase are non-overlapping in time.

10. An article as claimed in claim 9, wherein devices of the first type include devices to operate in compliance with a first communications standard, and wherein devices of the second type include devices to operate in compliance with a second communications standard.

11. An article as claimed in claim 9, wherein devices of the first type operate at approximately the same frequency as devices of the second type.

12. An article as claimed in claim 9, wherein the beacon frames indicate to devices of three or more types of devices not to transmit during phases that do not correspond to devices of the three or more types; and wherein the instructions, when executed, further result in providing multiple access to a medium in a wireless local area network by communicating with devices of the three or more types during phases that correspond to devices of a respective one of the three or more types.

13. An apparatus, comprising:
an omnidirectional antenna;
a transceiver to couple to said antenna; and
a baseband processor to couple to said transceiver, said baseband processor to communicate with devices of a first type during a first phase by transmitting a first beacon frame during the first phase to indicate to devices of a second type not to transmit during the first phase and to extend to another device type by overlapping medium reservations signaled with another beacon frame;
said baseband processor to communicate with devices of the second type during the second phase by transmitting a second beacon frame to indicate to devices of the first type not to transmit during the second phase;
wherein said first phase and said second phase are non-overlapping in time.

14. An apparatus as claimed in claim 13, said transceiver to operate at the same frequency as devices of the first type and at the same frequency of devices as devices of the second type.

15. An apparatus as claimed in claim 13, wherein the beacon frames indicate to devices of three or more types of devices not to transmit during phases that do not correspond to devices of the three or more types; said baseband processor to communicate with devices of the three or more types during phases that correspond to devices of a respective one of the three or more types.

16. An apparatus as claimed in claim 13, wherein more than one beacon frames are transmitted during each phase to indicate to devices of three or more types of devices not to transmit during phases that do not correspond to devices of the three or more types; said baseband processor to communicate with devices of the three or more types during phases that correspond to devices of a respective one of the three or more types.

* * * * *